(12) United States Patent
Mihalczo et al.

(10) Patent No.: US 6,471,888 B1
(45) Date of Patent: Oct. 29, 2002

(54) DUAL NEUTRON FLUX/TEMPERATURE MEASUREMENT SENSOR

(75) Inventors: John T. Mihalczo, Oak Ridge, TN (US); Marc L. Simpson, Knoxville, TN (US); Stephanie A. McElhaney, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 08/571,307

(22) Filed: Dec. 12, 1995

Related U.S. Application Data

(63) Continuation of application No. 08/320,411, filed on Oct. 3, 1994, now abandoned, which is a division of application No. 08/225,363, filed on Apr. 8, 1994, now Pat. No. 5,352,040, which is a continuation of application No. 07/933,372, filed on Aug. 24, 1992, now abandoned.

(51) Int. Cl.$^7$ ............... G01T 1/164; C09K 11/08; G01J 5/00
(52) U.S. Cl. ............. 252/301.17; 252/301.18; 252/301.34; 252/301.35; 252/301.36; 250/472.1; 250/483.1; 250/484.2; 250/484.3; 250/390.11
(58) Field of Search .............. 252/301.17, 301.18, 252/301.34, 301.35, 301.36; 250/472.1, 483.1, 484.2, 484.3, 390.11

(56) References Cited

U.S. PATENT DOCUMENTS 3,574,129 A * 4/1971 Hammond et al. .... 252/301.36
3,887,753 A * 6/1975 Ninagawa et al. ..... 252/301.36
4,508,636 A * 4/1985 Ochiai ................... 252/301.36
5,168,540 A * 12/1992 Winn et al. ................ 385/128
5,352,040 A * 10/1994 Mihalczo et al. ........... 374/131

OTHER PUBLICATIONS

Stedman, Scintillator for Thermal Neutrons Using 6LiF and ZnS(Ag), (Date Unknown).*

Aliison et al., Remote Thermometry in a Combustion Environment Using a Phosphor Technique, SPIE vol. 788, Flow Visulaization and Aero–Optics in Simulated Environments, 1987.*

Stedman, "Scintillator for Thermal Neutrons Using Lithu 6tl F and ZnS(Ag)", (Date Unkown).*

Allison et al, SPIE vol. 788, Flow Visulaization and Aero–Optics in Simulated Environments, 1987.*

* cited by examiner

*Primary Examiner*—Alan Diamond
(74) *Attorney, Agent, or Firm*—Kilpatrick Stockton LLP

(57) ABSTRACT

Simultaneous measurement of neutron flux and temperature is provided by a single sensor which includes a phosphor mixture having two principal constituents. The first constituent is a neutron sensitive $Li^6F$ and the second is a rare-earth activated $Y_2O_3$ thermophosphor. The mixture is coated on the end of a fiber optic, while the opposite end of the fiber optic is coupled to a light detector. The detected light scintillations are quantified for neutron flux determination, and the decay is measured for temperature determination.

5 Claims, 3 Drawing Sheets

LIFETIME VS TEMPERATURE FOR EUROPIUM-DOPED YTTRIUM OXIDE

DUAL NEUTRON FLUX/TEMPERATURE MEASUREMENT SENSOR

This application is a continuation of Ser. No. 08/320,411 filed Oct. 3, 1994 now abandoned, which is a divisional of Ser. No. 08/225,363 filed Apr. 8, 1994 now U.S. Pat. No. 5,352,040, which is a continuation of Ser. No. 07/933,372 filed Aug. 24, 1992 now abandoned.

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to radiation interaction measurement devices and temperature measurement devices and, more specifically, to a dual neutron flux/temperature measurement sensor which utilizes a phosphor mixture having two principal constituents, one being neutron sensitive and the other being temperature sensitive.

BACKGROUND OF THE INVENTION

It is well known that emission properties of phosphors vary in accordance with temperature. This correlation has been used to devise various types of thermometry hardware. For example, surface temperature of a rotating flywheel has been measured by inducing fluorescence from a pulsed nitrogen laser in a material that includes lanthanum oxysulfide doped with europium. The temperature dependence of the phosphor emission has been shown both in amplitude and lifetime changes. With a pulsed laser as the stimulating source, either the ratio of two emission line intensities (amplitudes) or the lifetime of some selected line can be used to determine the temperature.

In the field of nuclear reactor engineering, the interactions of neutrons with nuclei are important to the release of nuclear energy in a form capable of practical utilization. Inelastic neutron collisions do not occur below energies of about 0.1 Mev, but elastic collisions between neutrons and nuclei will be effective in slowing down the neutrons until their average kinetic energy is the same as that of the atoms of a scattering medium. This energy depends on the temperature of the medium, and is thus referred to as thermal energy. Neutrons whose energies have been reduced to values in this region are designated "thermal neutrons".

Phosphors have been used to measure thermal neutron flux. A mixture of boron-containing plastic and ZnS(Ag) phosphor has been used to provide a slow-neutron scintillator. A slow neutron passing through the scintillator is captured by a B10 nucleus. The resultant energetic alpha and lithium particles reach a ZnS(Ag) granule with sufficient residual energy to cause a scintillation. Light from the scintillation travels to the photomultiplier photocathode and reaches it with sufficient intensity to cause a recognizable pulse at the anode. The slow-neutron scintillators have been made by using a transparent bioplastic mold cast from a negative steel mold. In use, the surface of the scintillator faces a photomultiplier, while the opposite surface is covered with aluminum foil or other light reflective coating. See, for example, "High Efficiency Slow-Neutron Scintillation Counters", NUCLEONICS, by K. H. Sun et al. (July, 1956).

The extreme environment of some nuclear reactor cores, with temperatures in the range of 1,000° C., presents a difficult problem for sensing both temperature and neutron flux. A need exists for an improved sensor capable of simultaneously measuring both neutron flux and temperature.

SUMMARY OF THE INVENTION

An object of the present invention is to provide a single sensor capable of providing simultaneous measurement of both neutron flux and temperature.

Another object of the present invention is to provide a sensor which is easy to install and relatively simple in construction.

These and other objects of the invention are met by providing a dual neutron flux/temperature measurement sensor which includes a phosphor mixture having a first neutron-sensitive phosphor constituent and a second activated thermophosphor constituent coated on an end of a fiber optic, and means for detecting light generated by charged particles produced by neutron absorption in the first constituent. The first constituent produces the charged particles when neutrons are absorbed therein, and the charged particles produce scintillations in the second constituent. The scintillations of the second constituent are detected and correlated to a temperature value which varies in accordance with variations in the detected scintillations. The second constituent is preferably a rare-earth activated thermophosphor.

Other objects, advantages and salient features of the invention will become apparent from the following detailed description, which, taken in conjunction with the annexed drawings, discloses preferred embodiments of the invention.

DETAILED DESCRIPTION OF THE PREFERRED EMBODIMENTS

Figure 1:
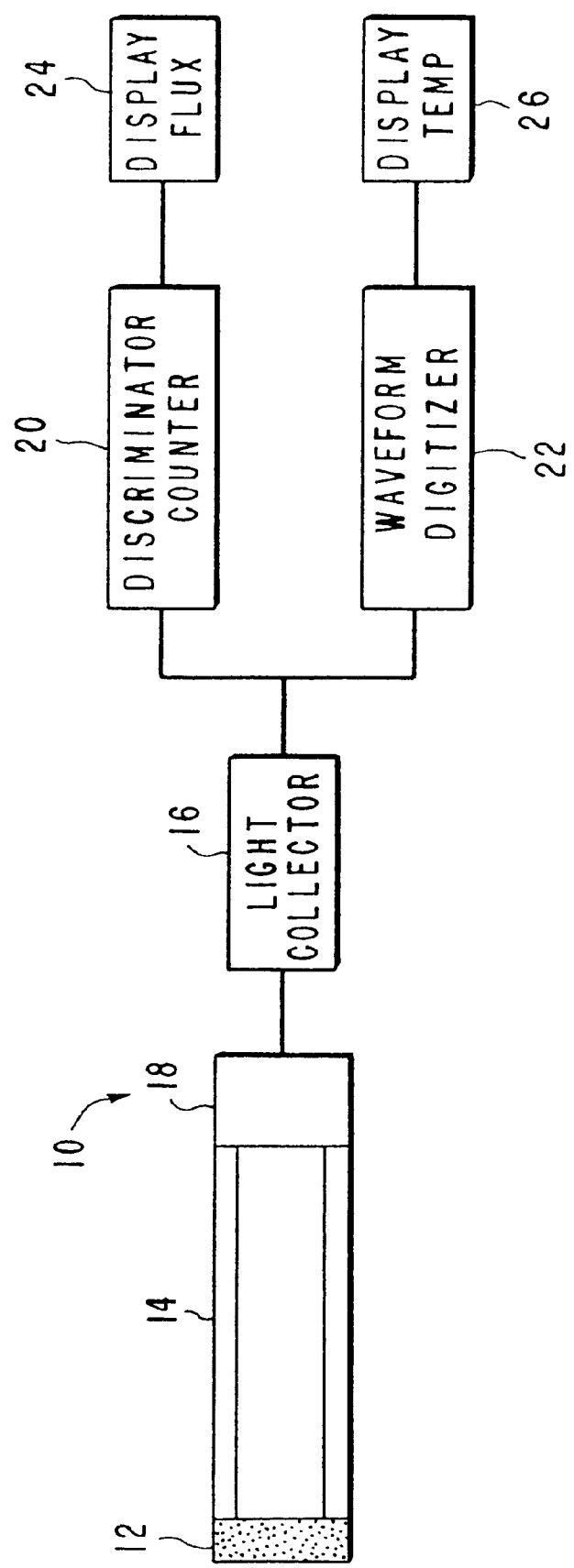
FIG. 1 is a schematic view of a dual neutron flux/temperature measuring sensor according to a preferred embodiment of the present invention.
Figure 2:
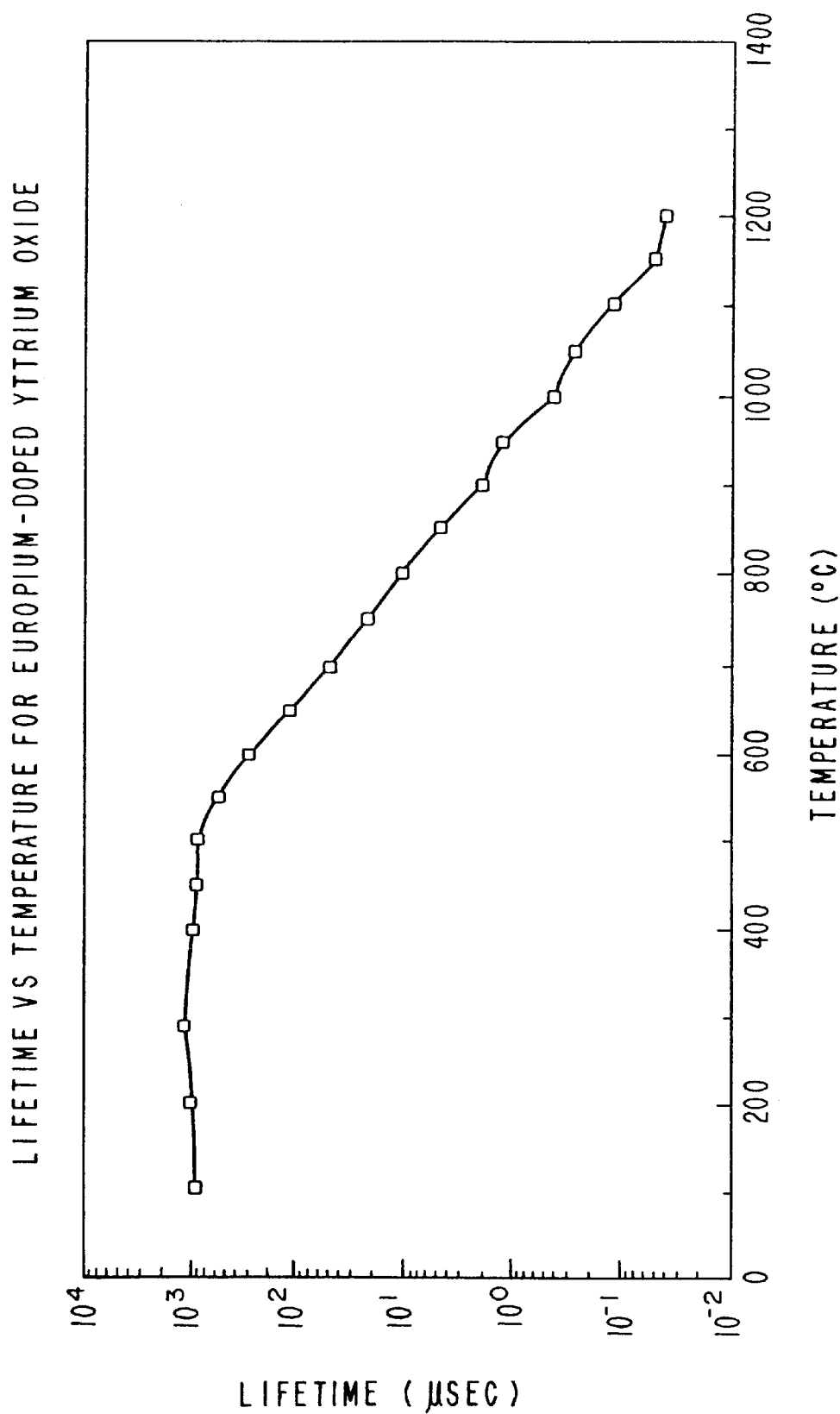
FIG. 2 is a graph showing europium-activated yttrium oxide showing the logarithmic dependence of the fluorescence decay rate on temperature.
Figure 3:
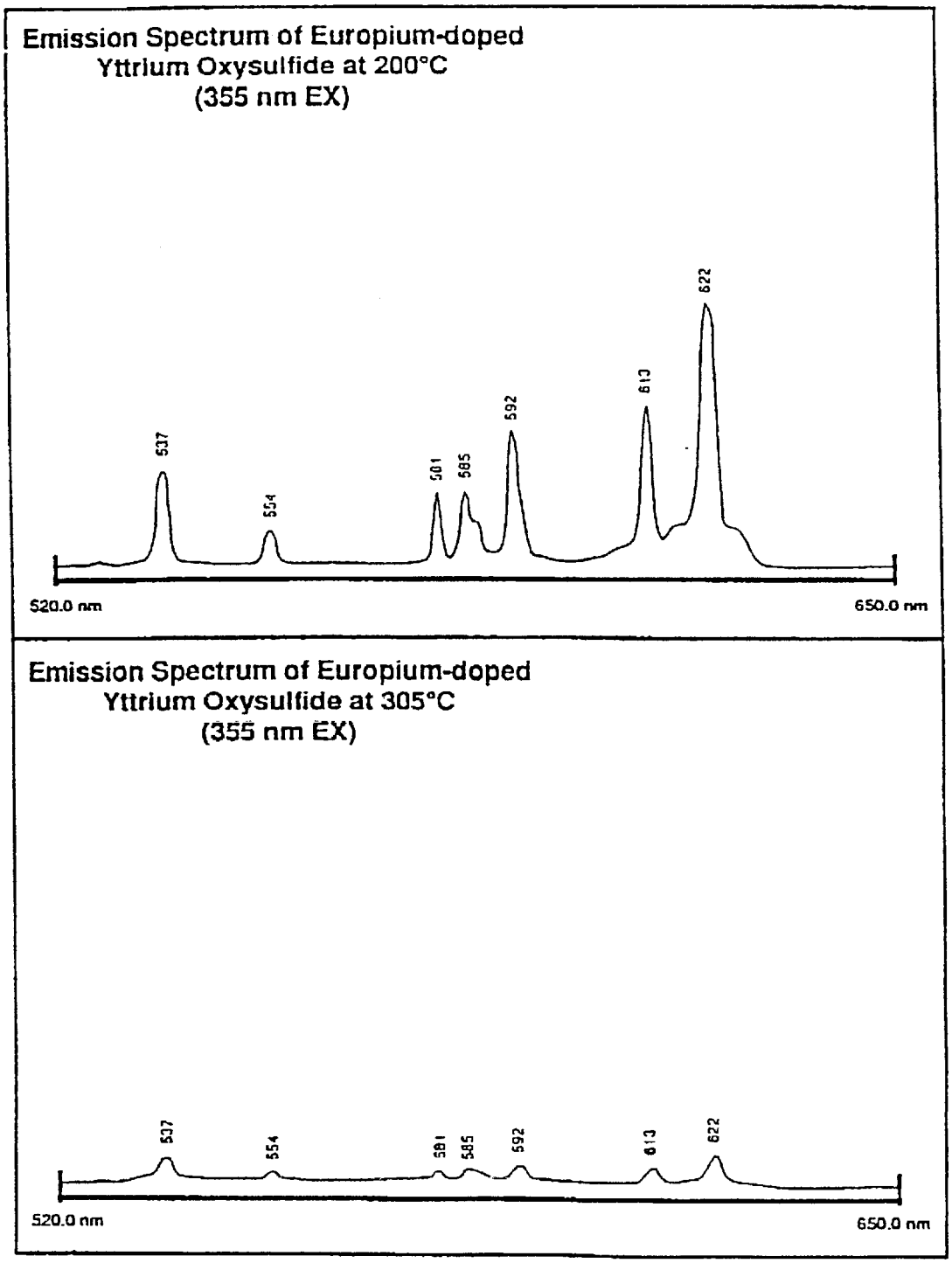
FIG. 3 is an illustration of the peak emission spectrum's amplitude dependence of europium-activated yttrium oxysulfide on increasing temperature.

Referring to FIGS. 1, 2 and 3, a dual neutron/flux temperature measurement sensor 10 includes a coating 12 made of a phosphor mixture homogeneously distributed within an optically transparent binder. The mixture is applied to and forms the coating 12 on the bare tip of a fiber optic 14. The mixture includes a first neutron sensitive phosphor constituent and a second activated thermophosphor constituent. The second constituent is preferably a rare-earth activated thermophosphor, but may also be a metal activated thermophosphor. When the sensor 10 is used to sense conditions in a nuclear reactor, thermal neutrons are detected in the first phosphor constituent via neutron absorption. When the neutrons are absorbed within the first constituent, charged particles are created which in turn produce scintillations in the activated thermophosphor. The ambient temperature surrounding the coating can be monitored by observing the ratio of two emission line amplitudes and/or the decay rates of the scintillations from the activated thermophosphor.

Neutrons are neutral particles which normally are detected through nuclear reactions which result in energetic charged particles such as protons, alpha particles, etc. Conventional methods can then be incorporated to detect the charged particles. According to the present invention, a scintillation technique is preferable for detecting the charged particles created from the absorptions of a neutron.

In one particular embodiment, the mixture forming the coating 12 includes as the first constituent $Li^6F$ (95% $Li^6$) and rare-earth activated $Y_2O_3$. The $Li^6F$ (95% $Li^6$) has a high cross-section for thermal neutrons (940 barns) and, when the neutron is absorbed, produces an alpha and a triton. These charged particles are then detected by the rare-earth activated Y203, producing visible light scintillations which are guided to a light collector 16 by the fiber optic 14. The light collector 16 can be a photodiode or a photomultiplier tube, for example.

The fiber optic may be made of quartz or sapphire or other comparable materials that are transparent to the scintillation light. The thickness of the phosphor material coated onto the tip of the fiber is such that the light pulses leaving the coating 12 are not significantly attenuated.

Thermographic phosphors have a useful property in that the luminescence of the phosphor changes in emission line amplitude and decay rate with changes in temperature. As shown in FIG. 2, as the temperature of the surrounding environment is increased, the lifetime of the fluorescence induced in the phosphor decreases logarithmically. The graph shows lifetime verses temperature for europium-doped yttrium oxide. When the neutron is absorbed in the $Li^6F$, charged particles are produced which create scintillations in the rate-earth activated $Y_2O_3$. The lifetime and emission line amplitude of the scintillations will be determined by the characteristic properties of the rare-earth activated $Y_2O_3$, mainly the temperature of the phosphor. If the temperature of the sensor surroundings changes, this will be indicated by a change in the ratio of two emission line amplitudes and decay rate of the induced scintillations which are detected by the light collector 16 at the end of the fiber optic 14 opposite the phosphor coated end.

Light from the fiber optic 14 passes through a bandpass filter 18 before entering the light collector 16. Once the scintillations reach the light collector 16, the pulses are amplified. Amplification preserves the time emission peak characteristics of the pulse which is simultaneously directed to a discriminator-counter 20 for determining neutron flux and a waveform digitizer 22 or other suitable device to obtain the temperature dependent pulse decay constant or ratio of two emission line amplitudes. Other suitable means may be employed for performing the functions of the discriminator-counter 20 and the waveform digitizer 22.

A practical use of the sensor 10 which incorporates a $Li^6F$ phosphor mixture is to measure tritium production at a point in a reactor or zero power experiment and also simultaneously measure temperature.

Many alternative coatings can also be made which serve as both a neutron absorber and scintillator. For example, $Y_2O_3$:Gd could be used as the neutron-sensitive activated thermophosphor. Using a single neutron-sensitive thermophosphor has advantages over mixing a neutron-sensitive phosphor and a thermophosphor, in that there is no concern over optimizing the ratio of the two phosphors. Moreover, there is no potential for inhomogeneity due to inadequate mixing. Advantageously, the large cross-section for gadolinium allows for thinner phosphor layers, thus reducing any gamma interactions.

Measurements of other radiation interactions can be achieved by selecting a radiation-sensitive material in the phosphor mixture to be compatible with the type of interaction being measured, such as measuring fission fragments, beta particles, etc., with alternative versions used at reactors, fusion machines, or accelerators.

The binder material can be of any suitable material which is optically transparent. Binders also exhibiting radiation resistance could be used, and would provide for measurements in high radiation fields. As an example, a colorless polyester can be used as the binder material.

The sensitivity of the sensor 10 can be adjusted by varying the amount of reacting material in the coating 12. This feature may have particular significance where the sensor 10 is required not to significantly attenuate the radiation beam or production. Also, the nuclear reacting constituent mixed with the thermophosphor constituent can be varied to utilize reaction rates for other material while simultaneously measuring the temperature.

If a high-temperature thermophosphor is selected, the temperature can be monitored in environments up to 1500° C., depending on the thermophosphor used, the survivability of the binder/fiber, and on the temperature limit of the thermophosphor. Therefore, the probe can be customized to specific temperature ranges by choosing appropriate thermophosphors.

The electronic components for processing the signal output from the light detector 16 are conventional. Each of the discriminator-counter 20 and the waveform digitizer can be provided with visual displays 24 and 26, respectively, indicating the respective measured values of neutron flux and temperature. A commercially available waveform digitizer suitable for use in the present invention is sold by Tektronix as model no. 7854. For a general description of similar components, see R. Stedman, "Scintillator for Thermal Neutrons Using $Li^6F$ and ZnS(Ag), *Rev. Sci. Instrum.*, 31, 1156, and K. H. Sun et al., "High-efficiency Slow-neutron Scintillation Counters", Nucleonics, 14(7), 46(1956), both of which are incorporated herein by reference.

While advantageous embodiments have been chosen to illustrate the invention, it will be understood by those skilled in the art that various changes and modifications can be made therein without departing from the scope of the invention as defined in the appended claims.

What is claimed is:

1. A scintillator comprising:
a first neutron-sensitive phosphor constituent and a second thermophosphor constituent, the first and second constituents being homogeneously distributed in an optically transparent binder, the first phosphor converting neutron particles to charged alpha particles by neutron absorption when exposed to radiation interaction, and the second thermophosphor converting the charged alpha particles to scintillations which vary in accordance with variations in ambient temperature surrounding the scintillator, wherein the first constituent is $Li^6F$ and the second constituent is rare-earth activated $Y_2O_3$.

2. The scintillator according to claim 1, wherein the $Li^6F$ is 95% $Li^6F$.

3. A scintillator comprising:
a first neutron-sensitive phosphor constituent and a second thermophosphor constituent, the first and second constituents being homogeneously distributed in an optically transparent binder, the first phosphor converting neutron particles to charged alpha particles by neutron absorption when exposed to radiation interaction, and the second thermophosphor converting the charged alpha particles to scintillations which vary in accordance with variations in ambient temperature surrounding the scintillator, wherein the second constituent includes europium.

4. A scintillator comprising:
a neutron-sensitive activated thermophosphor constituent homogeneously distributed in an optically transparent binder, and converting neutron particles to charged alpha particles by neutron absorption when exposed to radiation interaction, the thermophosphor constituent converting the charged alpha particles to scintillations which have a pulse decay time which varies in accordance with ambient temperature surrounding the scintillator, wherein the neutron-sensitive, activated thermophosphor constituent is neutron-sensitive, activated $Y_2O_3$.

5. A scintillator comprising:

a neutron-sensitive activated thermophosphor constituent homogeneously distributed in an optically transparent binder, and converting neutron particles to charged alpha particles by neutron absorption when exposed to radiation interaction, the thermophosphor constituent converting the charged alpha particles to scintillations which have a pulse decay time which varies in accordance with ambient temperature surrounding the scintillator, wherein the neutron-sensitive activated thermophosphor is activated by gadolinium.

* * * * *